United States Patent
Ludwig et al.

(10) Patent No.: US 8,929,830 B2
(45) Date of Patent: Jan. 6, 2015

(54) SYSTEMS AND METHODS FOR DETECTING A LOSS OF COMMUNICATION USING STATISTICAL ANALYSIS

(75) Inventors: Patrick Ludwig, Renton, WA (US); Thomas F. McGuffin, Bellevue, WA (US); Pankaj Bhutani, Rohatk (IN)

(73) Assignee: Honeywell International Inc., Morristown, NJ (US)

( * ) Notice: Subject to any disclaimer, the term of this patent is extended or adjusted under 35 U.S.C. 154(b) by 486 days.

(21) Appl. No.: 13/011,979

(22) Filed: Jan. 24, 2011

(65) Prior Publication Data

US 2012/0190306 A1    Jul. 26, 2012

(51) Int. Cl.
H04B 17/00 (2006.01)
H04B 7/185 (2006.01)
H04W 16/22 (2009.01)
H04W 24/02 (2009.01)
H04W 16/18 (2009.01)

(52) U.S. Cl.
CPC ........... *H04B 7/18506* (2013.01); *H04W 24/02* (2013.01); *H04W 16/18* (2013.01); *H04W 16/22* (2013.01)
USPC ...................................... 455/67.11; 455/431

(58) Field of Classification Search
USPC ......... 455/67.11, 436, 438, 441, 442, 44, 431
See application file for complete search history.

(56) References Cited

U.S. PATENT DOCUMENTS

| | | | |
|---|---|---|---|
| 5,193,216 A * | 3/1993 | Davis | 455/421 |
| 6,104,926 A | 8/2000 | Hogg et al. | |
| 7,356,389 B2 | 4/2008 | Holst et al. | |
| 2002/0010912 A1 | 1/2002 | Kasvand et al. | |
| 2003/0186693 A1 | 10/2003 | Shafran et al. | |
| 2003/0188029 A1 | 10/2003 | Shafran et al. | |
| 2004/0165561 A1 | 8/2004 | Chiou et al. | |
| 2005/0090201 A1 * | 4/2005 | Lengies et al. | 455/41.2 |
| 2005/0197748 A1 * | 9/2005 | Holst et al. | 701/3 |
| 2005/0254430 A1 * | 11/2005 | Clark et al. | 370/241 |
| 2006/0030311 A1 * | 2/2006 | Cruz et al. | 455/431 |
| 2006/0229104 A1 | 10/2006 | de La Chapelle et al. | |

(Continued)

FOREIGN PATENT DOCUMENTS

JP    2002010317    1/2002

OTHER PUBLICATIONS

European Patent Office, "European Search Report for Application No. 12151477.2", "for Foreign Counterpart U.S. Appl. No. 13/011,979", Sep. 3, 2014, pp. 1-3, Published in: EP.

(Continued)

*Primary Examiner* — Nay A Maung
*Assistant Examiner* — Erica Fleming-Hall
(74) *Attorney, Agent, or Firm* — Fogg & Powers LLC

(57) ABSTRACT

Systems and methods for detecting a loss of communications between an aircraft and a ground station are provided. In one embodiment, a system for detecting a loss of communication for an aircraft comprises: a communication detection software module resident as an application on an aircraft communication management unit (CMU); a CMU message router in communication with the communication detection software module; at least one radio coupled to the communication management unit; a statistical model of communications traffic density for an RF zone associated with a ground station; wherein the communication detection software module performs a statistical analysis of a current communications traffic density of radio communications observed by the at least one radio to determine when the aircraft has a lost a communications link with the ground station.

20 Claims, 3 Drawing Sheets

(56) References Cited

U.S. PATENT DOCUMENTS

| | | |
|---|---|---|
| 2006/0239238 A1 | 10/2006 | Fernandez-Corbaton et al. |
| 2008/0049231 A1* | 2/2008 | Bachalo et al. ............... 356/484 |
| 2008/0117858 A1* | 5/2008 | Kauffman .................... 370/316 |
| 2008/0125106 A1* | 5/2008 | Lee et al. ..................... 455/421 |
| 2008/0240029 A1* | 10/2008 | Lynch et al. .................. 370/329 |
| 2009/0092074 A1* | 4/2009 | Jamalipour et al. .......... 370/316 |
| 2009/0203394 A1* | 8/2009 | Shaffer et al. ................ 455/525 |
| 2009/0247137 A1* | 10/2009 | Awad ............................ 455/418 |
| 2009/0319236 A1* | 12/2009 | Blaunshtein et al. ............. 703/1 |
| 2010/0027425 A1* | 2/2010 | Cheung et al. ............... 370/238 |
| 2010/0167739 A1* | 7/2010 | Hughes ......................... 455/436 |
| 2011/0028147 A1* | 2/2011 | Calderhead et al. .......... 455/431 |
| 2011/0034196 A1* | 2/2011 | Jonishi et al. ................. 455/509 |
| 2011/0164562 A1* | 7/2011 | Qiu et al. ...................... 370/328 |
| 2012/0158219 A1* | 6/2012 | Durling et al. ................... 701/4 |
| 2012/0220290 A1* | 8/2012 | Awad ............................ 455/423 |

OTHER PUBLICATIONS

European Patent Office, "Office Action from EP Application No. 12151477.2 mailed Sep. 25, 2014", "from Foreign Counterpart of U.S. Appl. No. 13/011,979", Sep. 25, 2014, pp. 1-7, Published in: EP.

* cited by examiner

SYSTEMS AND METHODS FOR DETECTING A LOSS OF COMMUNICATION USING STATISTICAL ANALYSIS

BACKGROUND

Commercial aircraft typically maintain in-flight VHF radio communications with ground controllers and airline operations through an array of ground stations. As the aircraft travels along its route, it will exit the radio frequency (RF) signal area of one ground station and enter the RF signal area of the next. Because of the altitude and speed at which commercial aircraft travel, and because propagation characteristics of radio signals, as the aircraft exits the radio frequency (RF) signal area of a ground station, the signal strength of transmissions from the ground station will drop quickly such that communication connections are lost quickly, without any warning to the flight crew. As a result, commercial aircraft today can be without a connection to any ground station for up to 4 to 5 minutes before a connection is established with the next ground station, even if they are within RF range of the next ground station. During this interval, the flight crew is unaware that communications are lost and may miss important information.

For the reasons stated above and for other reasons stated below which will become apparent to those skilled in the art upon reading and understanding the specification, there is a need in the art for improved systems and methods for detecting a loss of communications between an aircraft and a ground station.

SUMMARY

The Embodiments of the present invention provide methods and systems for detecting a loss of communications between an aircraft and a ground station using statistical analysis and will be understood by reading and studying the following specification.

In one embodiment, a system for detecting a loss of communication for an aircraft comprises: a communication detection software module resident as an application on an aircraft communication management unit (CMU); a CMU message router in communication with the communication detection software module; at least one radio coupled to the communication management unit; a statistical model of communications traffic density for an RF zone associated with a ground station; wherein the communication detection software module performs a statistical analysis of a current communications traffic density of radio communications observed by the at least one radio to determine when the aircraft has a lost a communications link with the ground station.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention address the problem of detecting a loss of a connection to a ground station by providing the aircraft with means to the quickly determine when it has left the RF signal area (also referred to as an RF zone) of a Very High Frequency (VHF) ground station based on a statistical model of the RF communication within the RF signal area for the ground station. While the aircraft is still inside the RF signal area of the ground station, uplink communications from other commercial aircraft communication with the ground station can be monitored, stored, and used to create a statistical model of RF communications within the RF signal area. The statistical model can compile statistics such as the average number of transmission observed per second. When the monitored communication rates from other commercial aircraft begins to deviate from the statistical model established for that zone (for example, when a statistically long period of RF silence occurs) then embodiments of the present invention can determine a probability of whether the aircraft is still within communications range with the ground station. Based on the determined probability, the aircraft will make a determination of whether it is no longer within range of the ground station, and in at least one embodiment attempt to establish a connection with another VHF ground station or with an alternate communication source such as via high frequency (HF) radio or satellite. That is, VHF radio is presently the least expensive communication option. However, where VHF radio is not available (over an area of open ocean, for example), alternate systems can be utilized once a loss of connection with a VHF ground station is detected.

The types of VHF communications that occur between an aircraft and a ground station can include, but are not limited to, Airline Operations Communications (AOC) such as weather reports, landing, takeoff, gate or maintenance information, flight plans or advisories, or any RF message or protocol message such as acknowledgements, or air traffic control messages such as, but not limited to CPDLC messages.

Figure 1:
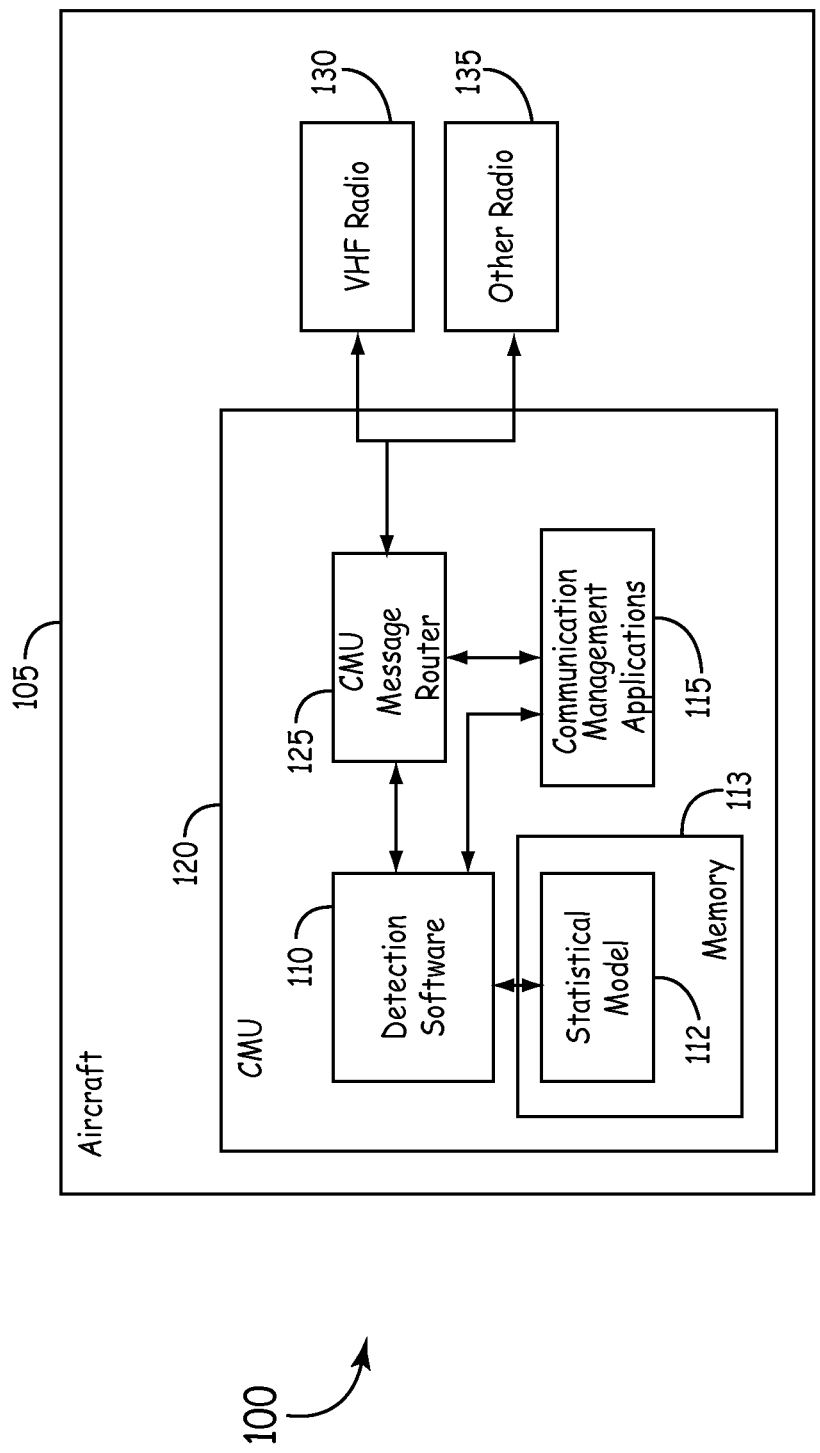
FIG. 1 is a block diagram of a system of one embodiment of the present invention.

FIG. 1 is a block diagram illustrating a system 100 for detecting a loss of communication for an aircraft 105 on one embodiment of the present invention. In the embodiment illustrated in FIG. 1, system 100 is implemented using detection software 110 resident as an application on aircraft 105's communication management unit (CMU) 120. CMU 120 communicates with the ground via communication links established at least through a VHF radio 130. Typically, CMU 120 will have access to additional radio equipment 135 for establishing other communication links such as, but not limited to satellite communications (SATCOM) or high frequency datalink (HFDL) communications. As the term is used herein, a communications management unit (CMU) refers the onboard computer system performing datalink routing functions for the aircraft via the Aircraft Communications Addressing and Reporting System (ACARS) and/or Aeronautical Telecommunications Network (ATN). CMU standards are defined in ARINC Characteristic 758. Detection software 110 is in communication with the CMU 120's message router 125 for the purpose of initiation a handoff from one ground station to the next communication service when a loss of connection is detected.

Figure 2:
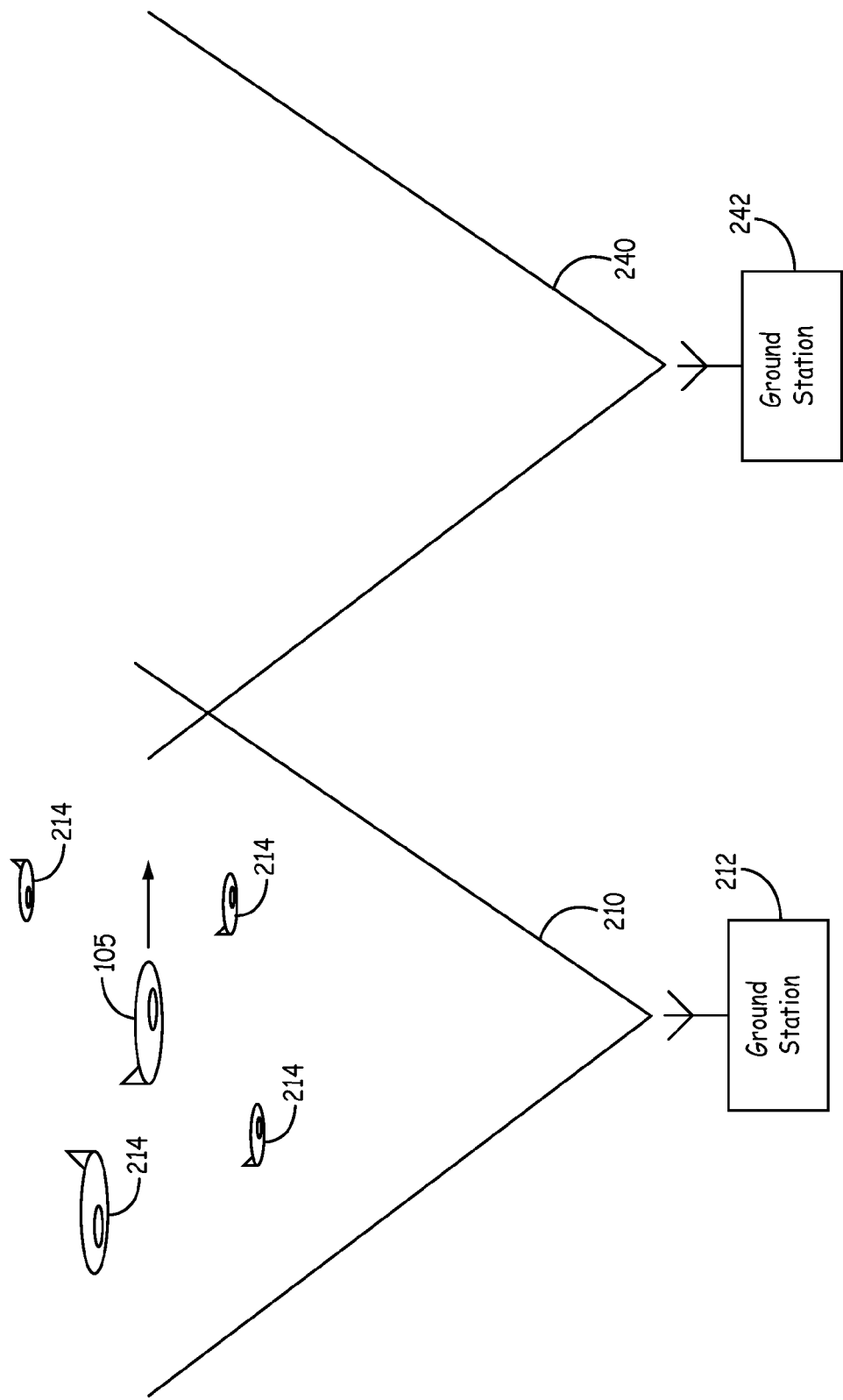
FIG. 2 is a diagram that illustrates an aircraft utilizing one embodiment of the present invention while traversing from one RF zone to another.

As further illustrated in FIG. 2, when aircraft 105 is flying inside a first RF zone 210 associated with a particular VHF ground station 212, there will exists a certain amount of normal, ambient, VHF communication traffic between the various other aircraft in the RF zone 210 (shown as aircraft 214) and the ground station 212. Because each of these other aircraft 214 will each use the same VHF frequency to communicate with the ground station 212 as aircraft 105, they can easily monitor each other's VHF communications with the ground station 212. Therefore, as aircraft 105 enters zone 210, it's radio 130 will pick up the radio traffic between the ground station 212 and other aircraft 214. Later, as aircraft 105 begins to leave zone 210, the density of traffic observed will become significantly less and eventually drop off.

Ground stations in different geographic regions will have different statistics based on the usual amount of commercial air traffic in the region. For example, an RF signal area for the North Atlantic corridor of the United State's east coast will, on average, carry a higher density of commercial air traffic communications than an RF zone in a less populated regions of the country. Accordingly, in one embodiment, detection software 110 builds a statistical model 112 of communications traffic density as it travels through an RF zone. In one embodiment, statistical model 112 is maintained in a memory 113 of CMU 120.

Using the statistical model 112, detection software 110 performs a statistical analysis of the current communications traffic density as received by VHF radio 130 to determine when aircraft 105 has lost its communication link with ground station 210. The current communications traffic density is determined by observing VHF communications between the other aircraft 214 and ground station 210. In one embodiment, in addition to observing the communication between aircraft 214 and ground station 210, detection software 110 with also observe aircraft 105's own communication with ground station 210. For example, assume the statistical model 112 compiled for zone 210 indicates that a VHF communication should be observed via radio 130, on average, once every 5 seconds. Detection software 110, in one embodiment, will use the current communications traffic density to determine the probability that when aircraft 105 has lost its communication link. For instance, in one implementation, according to statistical model 112, a VHF communication should be observed by radio 130, on average, once every 5 seconds. In that case, detection software 110 may determine that there is a 90% chance that the aircraft 105 is not in communication with the ground station 210 when no VHF communications are observed after a 30 second period. In one embodiment, only radio communications above a certain signal level are deemed "observed." If instead statistical model 112 indicates that a VHF communication should be observed, on average, every 15 seconds, the detection software 110 via a statistical analysis may determine that there is a 20% probability that the aircraft is not in communication with the ground station 210 when no messages are observed after a 20 second periods, and a 99% probability after 60 seconds. As would be appreciated by one of ordinary skill in the art upon studying this specification, the probability numbers presented above are provided for illustration purposes only.

In one embodiment, as an example, detection software 110 utilizes a statistical analysis based on a Poisson distribution generated via statistical model 112. That is, a Poisson distribution is generated from the expected average periodicity for receiving VHF communications (e.g., one communication per 15 second). The statistical analysis would then provide the numerical probability that a VHF communication should have been received at a time t seconds since the last VHF communication was received. When the calculated probability for a predetermined time period exceeds a predefined threshold (95%, for example) and no VHF communications is observed in that time period, detection software 110 concludes a loss of communication has occurred.

In one embodiment, when detection software 110 concludes that a loss of communication has occurred (for example, when the predetermined probability threshold is triggered), an alert is generated by detection software 110 to other communication management applications 115 on CMU 120 to evaluate what other communications options are available for establishing the next communications link for aircraft 105. For example, in one embodiment, when detection software 110 detects a loss of communication, it signals CMU message router to initiation a handoff from ground station 212 to the VHF frequency for the next RF zone (RF zone 240 for ground station 242, for example) appropriate for aircraft 105's flight path, or alternately manage a handoff to another communication service such as SATCOM or HFDL, when VHF is unavailable.

Where a handoff is performed such as from RF zone 210 to 240, a new software model 112 is generated to represent the communications traffic density expected for RF zone 240. In one embodiment, any statistical model developed for an RF zone is purged once the aircraft leaves that zone. In other embodiments, the model is stored for future reference should the aircraft enter that zone again.

Figure 3:
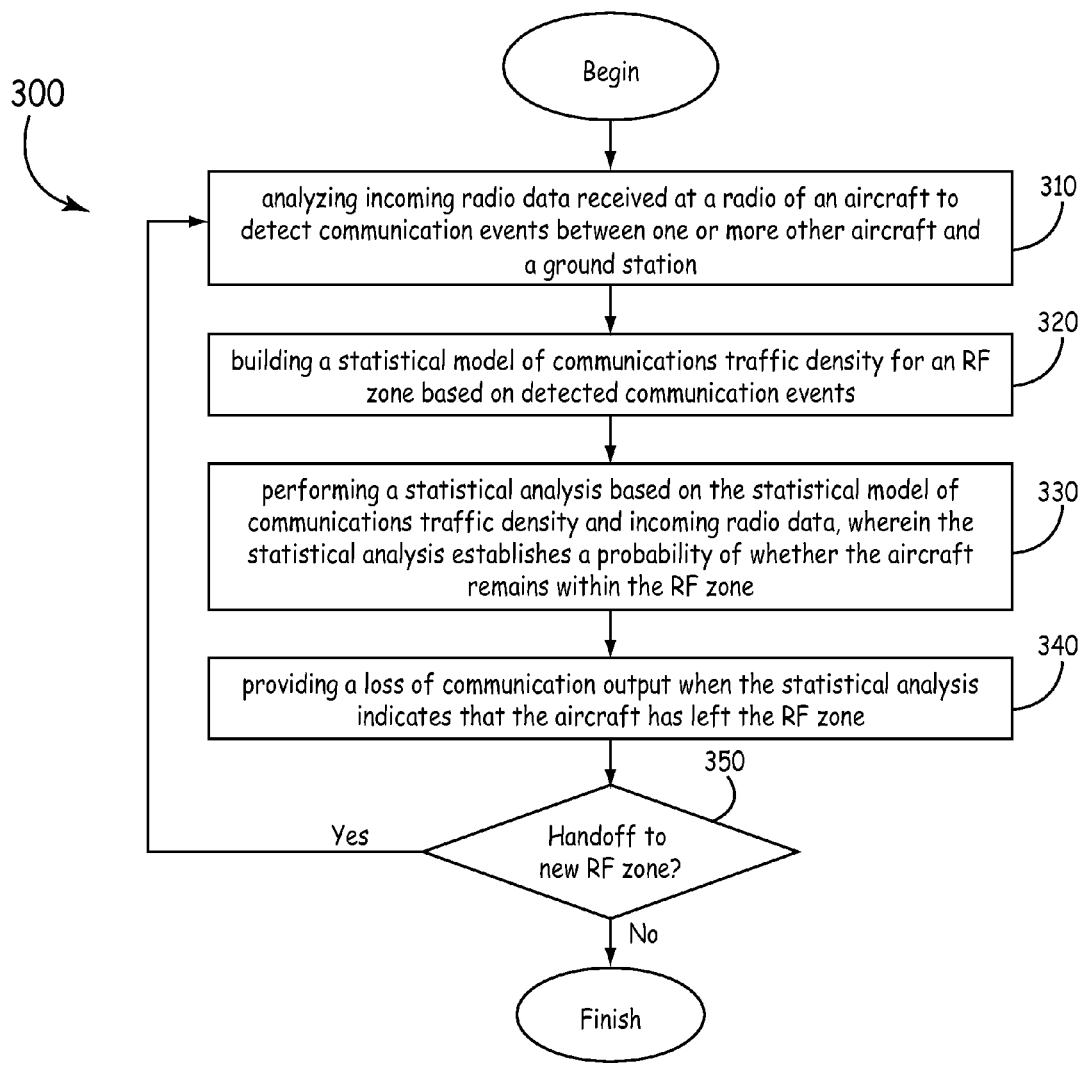
FIG. 3 is a flow chart of a method of one embodiment of the present invention.

FIG. 3 is a flow chart illustrating a method 300 of one embodiment of the present invention. In one embodiment, one or more elements of method 300 are implemented as computer executable code stored on and executed by an aircraft CMU, such as CMU 120. Further, although the method of FIG. 3 provides an example of method embodiment utilizing an aircraft as the subject vehicle, one of ordinary skill in the art upon reading this specification would appreciate that the method describe could apply to other vehicles and combinations of vehicle types. As such, embodiments of the present invention are not limited to vehicles including only aircraft.

The method begins at 310 with analyzing incoming radio data received at a radio of an aircraft to detect communication events between one or more other aircraft and a ground station. In one embodiment, the radio is a VHF radio. VHF radio signals are received by the aircraft's VHF radio, and in one embodiment are digitized to create the incoming VHF radio data for processing by a software application. VHF communication event comprise VHF communications between the other aircraft and the ground station. Because the other aircraft each use the same VHF frequency to communicate with the ground station the aircraft performing method 300, they can easily monitor each other's VHF communications with the ground station. Therefore, as the aircraft enters the RF zone for the ground station, it's VHF radio will pick up the radio traffic between the ground station and the other aircraft.

Later, as the aircraft leaves the RF zone, the density of traffic observed will become significantly less and eventually drop off.

The method continues at 320 with building a statistical model of communications traffic density for a RF zone based on detected communication events. RF zones in different geographic regions will have different statistics based on the usual amount of air traffic in the region, as explained above. Accordingly, in one embodiment, the software application builds a statistical model of communications traffic density as it travels through the RF zone. In one embodiment, the statistical model is maintained in a memory of the aircraft's CMU.

The method continues at 330 with performing a statistical analysis based on the statistical model of communications traffic density and incoming radio data, wherein the statistical analysis establishes a probability of whether the aircraft remains within the RF zone. In one embodiment, using the statistical model, the software application performs a statistical analysis of the current communications traffic density as indicated by the incoming radio data. As explained above with respect to FIGS. 1 and 2, the software application, in one embodiment, will use the current communications traffic density to determine a probability that indicates whether the aircraft has left the RF zone for the ground station and thus has lost its communication link. In one embodiment, performing a statistical analysis utilizes a statistical analysis based on a Poisson distribution generated via the statistical model to develop a conclusion of whether a loss of communication has occurred. In one embodiment the conclusion is based on whether the probability crosses a predetermined threshold.

The method continues at 340 with providing a loss of communication output when the statistical analysis indicated that the aircraft has left the RF zone. In one embodiment, when method concludes that a loss of communication has occurred (for example, when the predetermined probability threshold is triggered), an alert is generated. In one embodiment an output is generated to other applications on the CMU to initiate an evaluation of what other communications options are available for establishing the next communications link for the aircraft. For example, in one embodiment, when block 340 determines that a loss of communication has occurred, the software application signals the CMU message router to initiation a handoff to either another VHF frequency for the next RF zone, or alternately to another communication service such as SATCOM or HFDL when VHF is unavailable.

In one embodiment, when a handoff is performed to an new RF zone (determined at 350) the method continues at block 310 and a new software model is generated at 320 to represent the communications traffic density for the new RF zone. In one embodiment, any statistical model developed for an RF zone is purged once the aircraft leaves that RF zone. In other embodiments, the method includes storing previous model for future reference should the aircraft later re-enter a RF zone.

One of ordinary skill in the art upon reading this specification would appreciate that the systems and method described could also be applied to other RF communication technologies besides VHF radio. As such, embodiments of the present invention are not limited to detecting a loss of VHF communications, but include in scope other communication technologies such as, but not limited to, high frequency (HF) communications and satellite communications (SATCOM).

Several means are available to implement the systems and methods discussed in this specification. These means include, but are not limited to, digital computer systems, microprocessors, general purpose computers, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system for detecting a loss of communication for an aircraft, the system comprising:
    a communication detection software module resident as an application on an aircraft communication management unit (CMU);
    a CMU message router in communication with the communication detection software module;
    at least one radio coupled to the communication management unit;
    a statistical model of historical communications traffic density of radio communications observed by the at least one radio for an RF zone associated with a ground station, wherein the communication detection software module builds the statistical model;
    wherein the communication detection software module performs a statistical analysis of a current communications traffic density of radio communications observed by the at least one radio with respect to the statistical model to determine when the aircraft has lost a communications link with the ground station.

2. The system of claim 1, wherein the current communications traffic density is determined by observing communications between one or more other aircraft and the ground station.

3. The system of claim 1, wherein the communication detection software module builds the statistical model of communications traffic density for the RF zone associated with the ground station as it travels through the RF zone.

4. The system of claim 3, wherein the statistical model is maintained in a memory of the communications management unit.

5. The system of claim 1, wherein the statistical analysis performed by the communication detection software module calculates a probability based on communications statistics provided by the statistical model.

6. The system of claim 5, wherein the statistical analysis performed by the communication detection software module calculates a probability based on communications statistics provided by the statistical model and an elapsed time since a last observed radio communication.

7. The system of claim 1, wherein when the statistical analysis calculates a probability that exceeds a predetermined threshold, the communication detection software module generates an output indicating that the communication link with the ground station has been lost.

8. The system of claim 1, wherein the communication detection software module initiates a handoff from one ground station to a next communication service when a loss of connection is detected.

9. The system of claim 1, wherein the communication detection software module deems a radio signal to be a radio communication observed by the radio when the radio signal exceeds a predetermined signal level.

10. The system of claim 1, wherein the CMU is configured to establish datalinks with one or more ground stations using one or both of Aircraft Communications Addressing and Reporting System (ACARS) based datalinks and Aeronautical Telecommunications Network (ATN) based datalinks.

11. A method for detecting a loss of communication for a vehicle, the method comprising:
 analyzing incoming radio data received at a radio of the vehicle to detect communication events between one or more other vehicles and a ground station;
 building a statistical model of historical communications traffic density on the vehicle for an RF zone of the ground station based on detected communication events by the vehicle;
 performing a statistical analysis on the vehicle based on the statistical model of historical communications traffic density and incoming radio data, wherein the statistical analysis establishes a probability of whether the vehicle remains within the RF zone; and
 providing a loss of communication output when the statistical analysis indicates that the vehicle has left the RF zone.

12. The method of claim 11, wherein the radio is a very high frequency (VHF) radio.

13. The method of claim 11, wherein analyzing incoming radio data further comprises digitizing radio signals received by the radio to create the incoming radio data.

14. The method of claim 11, wherein building a statistical model of communications traffic density further comprises building the statistical model of communications traffic density from the incoming radio data as the vehicle travels through the RF zone.

15. The method of claim 11 wherein performing the statistical analysis further comprises:
 calculating a probability of whether the vehicle remains within the RF zone by performing a statistical analysis of the current communications traffic density as indicated by the incoming radio data based on the statistical model.

16. The method of claim 11 wherein with providing a loss of communication output further comprises:
 generating an output that initiates a handoff from the ground station to a next communication service when a loss of connection is detected.

17. The method of claim 16 wherein the next communication service comprises one of:
 a VHF communication link;
 a satellite communication (SATCOM) communication link;
 a high frequency datalink (HFDL) communication link.

18. A non-transitory computer readable media device having computer-executable instructions for a method for detecting a loss of communication for an aircraft, the method comprising:
 a communication detection software module resident as an application on an aircraft's communication management unit (CMU), the communication detection software:
  performing a statistical analysis of a current communications traffic density of radio communications observed by a radio onboard the aircraft to determine when the aircraft has lost a communications link with a ground station;
  analyzing incoming radio data received at the radio to detect communication events between one or more other aircraft and the ground station;
  building a statistical model of historical communications traffic density for an RF zone of the ground station based on detected communication events; and
  performing the statistical analysis based on the statistical model of historical communications traffic density and incoming radio data, wherein the statistical analysis establishes a probability of whether the aircraft remains within the RF zone.

19. The computer readable media device of claim 18, the method further comprising
 providing a loss of communication output when the statistical analysis indicated that the aircraft has left the RF zone of the ground station.

20. The computer readable media device of claim 19, wherein the communication detection software module builds the statistical model of communications traffic density for the RF zone of the ground station as the aircraft travels through the RF zone.

* * * * *